United States Patent [19]

Carneiro da Silva et al.

[11] Patent Number: 4,568,374

[45] Date of Patent: Feb. 4, 1986

[54] PROCESS FOR THE PREPARATION OF FERTILIZERS BY THE PARTIAL SOLUBILIZATION OF PHOSPHATE ROCKS

[75] Inventors: Alberto C. Carneiro da Silva, Niterói; Fábio G. Martins Costa, Icaraí-Niterói; Hosam A. Abdallah-Rehim, Rio de Janeiro; Elisabeth M. Moreira, Rio de Janeiro; Glória M. G. Soares, Rio de Janeiro; Jaime C. da Silva, Rio de Janeiro, all of Brazil

[73] Assignee: Petroleo Brasileiro S.A. - Petrobras, Brazil

[21] Appl. No.: 639,645

[22] Filed: Aug. 10, 1984

[30] Foreign Application Priority Data

Jan. 26, 1984 [BR] Brazil .................................. 8400318

[51] Int. Cl.⁴ .............................................. C05B 7/00
[52] U.S. Cl. ............................................ 71/36; 71/40
[58] Field of Search ...................................... 71/36, 40

[56] References Cited

U.S. PATENT DOCUMENTS

| 1,871,195 | 8/1932 | Ober et al. | 71/40 |
| 2,036,494 | 4/1936 | Plummer | 71/40 |
| 2,038,788 | 4/1936 | Harvey et al. | 71/40 |
| 3,172,751 | 3/1965 | Datin | 71/40 |
| 4,321,077 | 3/1982 | Schroeder et al. | 71/40 |

Primary Examiner—Ferris H. Lander
Attorney, Agent, or Firm—Sughrue, Mion, Zinn, Macpeak and Seas

[57] ABSTRACT

The object of the invention comprises a process for the preparation of fertilizers by solubilizing phosphate rocks containing impurities, which make processing thereof difficult.

The process is a simple and direct one. The product thus prepared is easily handled, can be directly used as a powdered fertilizer and dispenses with any post-treatment steps, such as purification, filtration, etc.

The rock is solubilized with acid ammonium sulfate or a mixture thereof with sulfuric acid. This acid ammonium sulfate can be formed "in situ", by the reaction of ammonium sulfate and sulfuric acid.

Reaction may take place in a mixing reactor, on a belt conveyor or in a granulator.

10 Claims, 2 Drawing Figures

PROCESS FOR THE PREPARATION OF FERTILIZERS BY THE PARTIAL SOLUBILIZATION OF PHOSPHATE ROCKS

FIELD OF THE INVENTION

The invention relates to a process of preparing fertilizers by the partial solubilization of phosphate rocks or phosphate-containing materials of any origin. More particularly, the object of the invention is a simple and direct process for making fertilizers which is especially suitable for the partial solubilization of phosphate rocks and tailings having a high impurity level. This process allows for the dispensing with a number of post-treatment steps, usually carried out in the fertilizer industry such as extraction, filtration and the like. Further, using this process a product is obtained that can be used directly as a fertilizer, both in powder and granulate form, and which exhibits good agricultural performance.

DESCRIPTION OF PRIOR ART

Conventional phosphate rock solubilizing processes using ammonium bisulfate, include that disclosed in Brazilian Patent Application No. PI 204460, describing the production of nitro-phophorus fertilizers/through the reaction of phosphate rock with mixtures of inorganic acids and potassium(or ammonium) bisulfate and ammonium sulfate. Such a process, however, has the disadvantage of using a large amount of ammonium bisulfate(an amount sufficient for preciptating all of the calcium from the phosphorus source as calcium sulfate), as well as the need for separating the gypsum in a filtration step(for the purposes of later regeneration of the ammonium sulfate), a further disadvantage being that this method's object comprises the production only of fertilizers that are completely water soluble.

The prior art also includes British Pat. No. GB 1289170 disclosing a process for obtaining concentrated phosphoric acid and water soluble phosphates, by reacting phosphate rock with an ammonium bisulfate solution. This process, however does not aim at direct production of a fertilizer, which is prepared only after solvent extraction of phosphate ions and subsequent reaction with ammonia. In addition, as in the case of the above-referenced patent application, very large proportions of ammonium bisulfate to phosphorus pentoxide present in the rocks are used, namely, a minimum 4:1 mass ratio. Finally, due to phosphoric acid yield restrictions, a rather low and narrow water content range in the reaction medium is claimed, which makes it difficult to homogenize the mixture.

The prior art further comprises U.S. Pat. No. 3,172,751, which disclosed phosphate rock solubilization with an ammonium bisulfate solution. Said process however, aims at obtaining quite a large amount of water-soluble products(mono- and di-ammonium phosphates), thus operating at $H^+/P_2O_5$ mole ratios in excess of 5:1, further providing a 10–15% excess of ammonium bisulfate over the stoichiometric amount required for reaction. Besides that excess of acidifying agent, the process is quite restricted through the ammonium bisulfate solution concentration and the operating temperatures, both of which being regarded as critical parameters.

British Pat. No. GB 2052467 describes a process for the preparation of fertilizers, based upon the reaction of phosphate mineral feedstock with sulfuric acid and ammonium sulfate. However, like the other previously described methods, this process uses filtration for separating the gypsum formed in the reaction, thereby losing part of the water-insoluble, but citric acid-soluble $P_2O_5$, while also presenting the usual problems in connection with gypsum filtration. In addition, there is the drawback of a wet milling step as a means of initially contacting the reactants prior to their passing through a series of reactor-crystallizers.

Referring to the prior art methods of direct acidifying in a granulator, Brazilian Patent Application No. PI 7905270 discloses a process of partial acidification of phosphate rocks with a sulfuric acid solution in a granulator and subsequent granulation of the product in a single-step operation, the object of said process, however, solely comprising the drying of the phosphate concentrate, wherefor it uses quite low $H^+/P_2O_5$ mole ratios, in the range of 0.5:1 to 1.5:1.

Also included within the scope of granulation processes, Brazilian Patent Application No. PI 8005441, discloses a method for the direct partial acidification of phosphate rocks in a granulator, with a strong inorganic acid. Although the $H^+/P_2O_5$ mole ratios used in this process fall within the normal range for partial acidification, namely, from 0 to 3.5 conversion rates are unsatisfactory; a maximum 50% of 2% citric acid based solubility was achieved, for a 2.5 acidification level. Besides the low yields, no working ranges for temperature and residence time have been defined.

Lastly, none of the two last mentioned references discloses the use of an ammonium salt; as a result, the products prepared by those methods lack the nitrogen nutrient.

The present applicant, in a previous Brazilian Patent Application, No. PI 8105391, suggested minimizing the various disadvantages mentioned in connection with the manufacture of fertilizers, by reacting phosphate rock with ammonium bisulfate at a ratio of 0.4 to 0.7 parts by weight of ammonium salt to 1 part by weight of rock, at a temperature between 80° and 130° C. and in the presence of an amount of water sufficient to make up a moisture content of at least 16%.

SUMMARY OF THE INVENTION

Through continuing research work, the applicatant has found that the solubility of the fertilizer prepared by the above-mentioned process, both in a 2% citric acid solution and in water, could be still further controlled by means of a combination of the temperature, residence time, water content and $H^+/P_2O_5$ mole ratio factors.

The applicant has noted that it is possible to react phosphate rock with ammonium sulfate alone, with mixtures of ammonium bisulfate and sulfuric acid, or mixtures of ammonium sulfate and sulfuric acid, which may be prepared prior to reaction or in situ without impairing the high quality of the final product.

As a result of such studies, the applicant has achieved preparation of an easily handled fertilizer, through a direct process that obviates the need for several post-treatment steps, having the advantage of working at lower temperatures, and in an operating system that is more simple than the previously developed one, the product showing good agricultural results.

It is therefore an object of the present invention, to provide a process for preparing a fertilizer by the reaction of phosphate rock with a reactant selected from the group consisting of ammonium bisulfate, ammonium bisulfate plus sulfuric acid, and ammonium sulfate plus sulfuric acid, provided that the ratio of H+ ions to moles of $P_2O_5$ insoluble in 2% citric acid is between 1 and 5, for a time of from 1 to 120 minutes, at a temperature of between 30° and 130° C., in the presence of an amount of water such as to provide a mass ratio of water to dry rock concentrate of between 0.30 and 1.0, with the mole ratio of ammonium/sulfate to sulfuric acid in the reaction system or the bisulfate reactor being between 0.25 and 2.0.

More particularly, it is an object of the invention to provide a process for preparing a fertilizer, requiring no post-treatments, that is easily handled, and can be directly used as a powdered or granulated solid, through reaction of phosphate rocks with a reactant selected from the group consisting of ammonium bisulfate, ammonium bisulfate plus sulfuric acid, and ammonium sulfate plus sulfuric acid, where the $H^+/P_2O_5$ mole ratio is within the range of 2 and 3 in the presence of an amount of water corresponding to a mass ratio of water to dry rock concentrate within the range of 0.4 to 0.7, at a temperature of between 55° C. and 95° C., for a time of 1 to 10 minutes, and with an ammonium sulfato to sulfuric acid mole ratio in the reaction system or the bisulfate reactor of between 0.5 and 1.0.

According to the water content used and the desired physical form of the product, the reaction may be carried out in a mixing reactor, on a conveyor belt or in a granulator. The final product can thus be in grain or paste form, which, after suitable drying in a dryer or in ambient air, and milling, will be converted into a powder or dust.

The process according to the invention is preferably and advantageously applied to phosphate rocks or tailings of phosphate rock dressing, with a low content of $P_2O_5$ and a high level of impurities, in the form of iron and aluminum oxides, thus being recommended for Brazilian ores, among which products having such characteristics are widely available.

The process further provides for the utilization of phosphate rock pulp, obtained from the intermediate steps of ore dressing procedures, thus providing energy savings in the overall solubilization process, by eliminating the concentrate drying step.

DETAILED DESCRIPTION OF THE INVENTION

Figure 1:
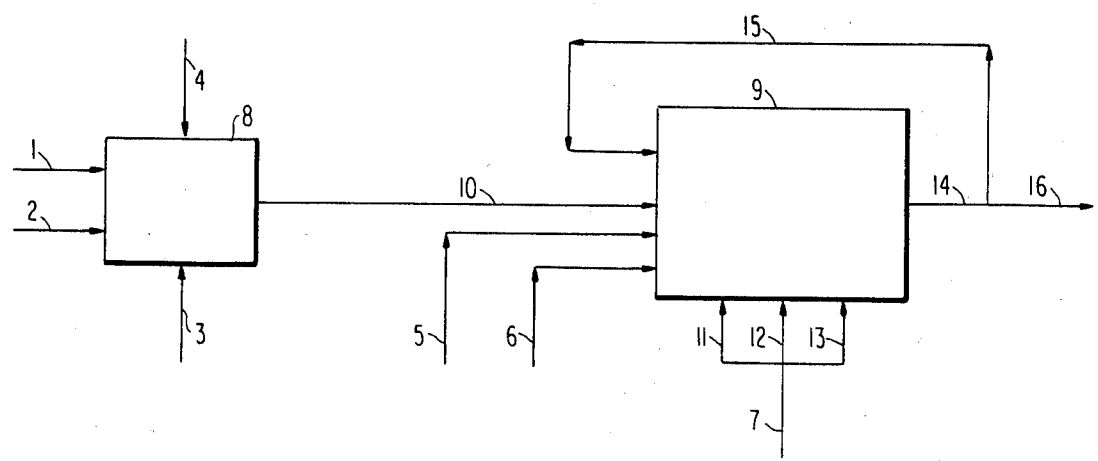
Figure 2:
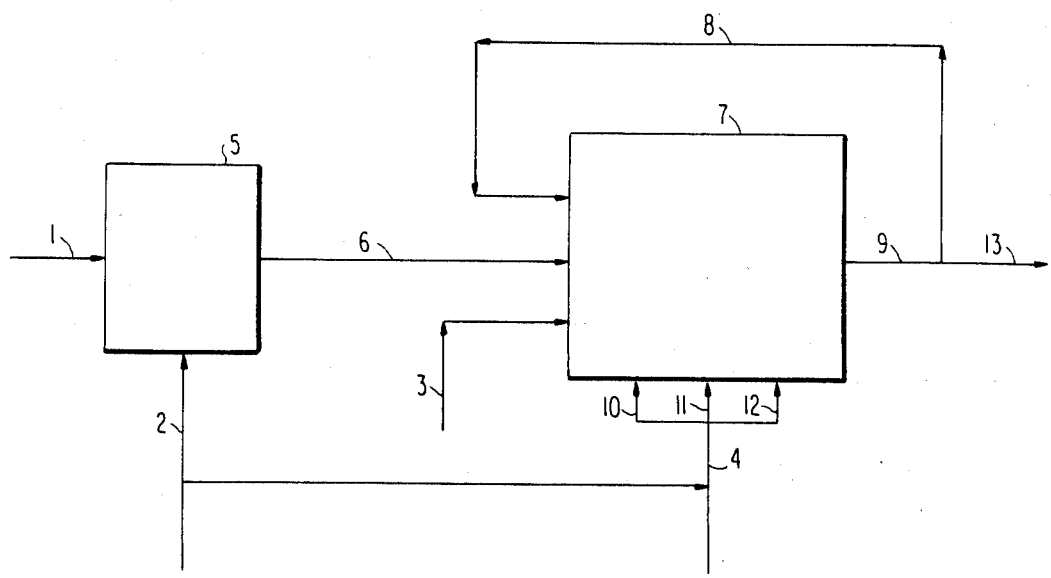

The reaction as carried out in a granulator, according to the instant invention, allows for several arrangements. FIGS. 1 and 2 suggest alternative ways of carrying out the solubilizing process.

FIG. 1 presents one embodiment of the invention. In accordance with the figure, an ammonium sulfate stream (1) or an ammonia stream (2), together with a sulfuric acid stream (3) and a water stream (4), are fed into ammonium bisulfate forming reactor (8). The heat generated in the reaction, in the case of using the ammonia stream (2) may eventually be used for product drying.

In reactor (8), a solution of 60 to 80 weight percent concentration of ammonium bisulfate is obtained, which is fed to granulator (9), which is also receiving powdered rock (5).

The solubilization reaction will take place in the granulator itself, for a residence time of 1 to 10 minutes, and at a temperature within the range of 30° to 90° C.

A portion of the thus obtained product (14) is recycled to granulator (9), through a recycle stream (15), corresponding to a recycle ratio of between 0.5 and 3.0; this recycle ratio is defined as the mass ratio of stream (15) to the sum of the other streams fed to granulator (9).

Alternatively, a rock pulp stream (6), at a 45 to 85 weight percent solids concentration, that may or not proceed from a phosphate rock beneficiation step, may be fed to granulator (9), alone or together with the powdered rock stream (5).

In the same way, a stream (7) of sulfuric acid or ammonium bisulfate solution, or still, ammonium bisulfate dissolved in sulfuric acid, can be fed to granulator (9), together with stream (10) of ammonium bisulfate solution.

Such a stream (7) of acidifying substance, as above described, may be subdivided into several streams (11,12,13,etc.), that will be partially fed along the length of granulator (9).

Thus, according to the present invention, in this first embodiment, two alternatives are possible, for the partial solubilization of phosphate rock in a granulator.

In one alternative (I), ammonium bisulfate would react with the powdered rock. Such an alternative could give rise to route (a) a further addition of an amount of ammonium bisulfate or sulfuric acid, or both, through stream (7), or route (b) no further addition of an acidifying substance.

Another alternative (II) would comprise ammonium bisulfate reaction with rock pulp. In this case the above-mentioned routes (a) and (b) would also be possible.

The mole ratio of ammonium sulfate (as a pure salt or prepared from ammonia and sulfuric acid) to sulfuric acid in reactor (8) may be the stoichiometric one, i.e., 1.1. There is a possibility, however, of using a mole ratio other than 1, with the above-mentioned alternatives I and II being modified in that case. In any event, it is important that in the reaction system (comprised of a mixing reactor, a conveyor belt or a granulator), the above-mentioned mole ratio be between 0.25 and 2.0.

FIG. 2 presents another embodiment of the invention. According to this figure, phosphate rock pulp (1), proceeding from some phosphate rock beneficiation step, is directed, together with ammonium sulfate (2), that may or not proceed from an ammonium sulfate forming reactor, to mixing vessel (5). The slurry thus obtained is then sent to granulator (7), which also receives a sulfuric acid stream (4), which permits "in situ" formation of ammonium bisulfate, for rock solubilization.

The solubilization reaction will take place in the granulator itself for a residence time of from 1 to 10 minutes and at a temperature between 30° and 90° C.

Part of product (9) is recycled to granulator (7), through a recycle stream (8), corresponding to a recycle ratio of between 0.5 and 3.0.

The ammonium sulfate employed in the process can be subdivided, a part thereof being directed to mixing vessel (5) and another part solubilized in sulfuric acid stream (4), being sent to granulator (7).

Stream (4) of sulfuric acid or ammonium sulfate plus sulfuric acid, can be subdivided into several streams (10,11,12, etc.) that are partially fed along the granulator.

The system further provides for powdered rock feed (3) together with rock pulp and ammonium sulfate (6) directly into granulator (7).

Accordingly, the instant invention process in the present embodiment, employs the following alternatives:

I—Mixing of rock pulp (1) with the entire amount ammonium sulfate (2), so as to completely solubilize that compound and subsequent feeding of this mixture to granulator (7), where sulfuric acid (4) is added, for "in situ" formation of ammonium bisulfate.

II—Adding of a portion of the ammonium sulfate required, together with the sulfuric acid (4), allowing the total amount of water fed to the graulator to be reduced.

III—Feeding powdered rock (3), together with the rock pulp and ammonium sulfate (6) to granulator (7), with the resulting variations as predicted in the two preceding alternatives.

Lastly, a third embodiment of the invention comprises the reaction between ammonium bisulfate and phosphate rock in a mixing reactor or on a conveyor belt, to obtain a powdered product. Such a reaction system is capable of the same variations as shown for the use of a granulator, with regard to the raw-material feeding modes.

In the following, some examples will be presented, that merely illustrate, but do not limit the scope of the invention.

EXAMPLE 1

In a laboratory bench unit, there was fed, through a peristaltic pump, 35 g/min of a pulp containing 45.8% concentrate from Patos de Minas (23.1% total $P_2O_5$), 12.1% dissolved ammonium sulfate and 42.1% water, to a beaker, the above-mentioned composition having been blended with 3.2 g/min sulfuric acid at 96% concentration, fed through a diaphragm metering pump, at a continuous rate, immediately prior to the dropping of the products into the container. Average temperature was 60° C., the product being cooled to room temperature. $H^+/P_2O_5$ mole ratio in the experiment was 2.4. A product was obtained, which after drying in an oven, weighed 47 g and presented the following composition: 15.6% total $P_2O_5$; 14.2% $P_2O_5$ soluble in 2% citric acid(1:100); 7.6% water-soluble $P_2O_5$ (1:250); 1% moisture and 3.7% total nitrogen.

EXAMPLE 2

In a laboratory bench unit, there was fed, by means of a peristaltic pump, 37 g/min of a pulp comprised of 58.5% Patos de Minas concentrate(23.1% total $P_2O_5$), 15.4% dissolved ammonium sulfate and 26.1% water, into a beaker, the above mixture having been blended with 7.4 g/min sulfuric acid at 96% concentration added through a diaphragm metering pump, in a continuous mode, immediately before the dropping of the products into the container. Average temperature was 85° C., the product having been cooled and dried under ambient conditions. The $H^+/P_2O_5$ mole ratio in the experiment was 4.1. The product, after drying, weighed 1,700 g and presented the following composition: 12.7% total $P_2O_5$; 12.5% of 2% citric acid-soluble $P_2O_5$ (1:100); 10.6% water-soluble $P_2O_5$(1:250); 12.2% moisture and 3% total nitrogen.

EXAMPLE 3

In a laboratory bench unit, there was fed into a granulator, through a peristaltic pump, 22.9% g/min of a pulp containing 30% Patos de Minas concentrate(23.1% total $P_2O_5$), 27% dissolved ammonium sulfate, and 43% water. This stream was fed over a continuous bed of grains, charged into the granulator through a metering device, at a flow rate of 54.4 g/min. The above-mentioned granules had 16.7% total $P_2O_5$, 8.3% $P_2O_5$ soluble in 2% citric acid solution (1:100), 2% moisture and 2% total nitrogen.

Over the bed formed by the mixing of the pulp stream and the granule recycle stream, a stream at a flow rate of 9.5 g/min was sprayed, comprised of 69.5% 100% sulfuric acid, 28.3% ammonium sulfate and 2.2% water, which stream is fed through a metering diaphragm pump.

$H^+/P_2O_5$ mole ratio, based on the recycle 2% citric-acid-insoluble $P_2O_5$ and on the $P_2O_5$ of the rock, was equal to 3.

The temperature profile in the granulator oscillated around 30° C.

There was obtained 3,845 g of a product with 13.2% total $P_2O_5$, 9.4% of 2% citric acid-soluble $P_2O_5$ (1:100), 6% water-soluble $P_2O_5$, 9% moisture and 3.3% total nitrogen.

EXAMPLE 4

In a pilot plant, there was fed, through a screw conveyor and into a rotating drum type granulator, 74 kg recycle granules, with 18.3% total $P_2O_5$, 9.2% $P_2O_5$ soluble in 2% citric acid(1:100), 3% moisture and 2% total nitrogen.

The above-mentioned granulator was also charged with a pulp comprised of 65 kg Patos de Minas concentrate (23.1% total $P_2O_5$), 15 kg ammonium sulfate and 23 kg water, through a centrifugal pump.

The above-mentioned pulp and recycle material amounts were mixed during the operating time of the granulator and, during this period, 24 kg sulfuric acid at 96% concentration was sprayed over the mass, providing a $H^+/P_2O_5$ mole ratio of 3, at a temperature level of 45° C.

180 kg of a granulated product with a 16.5% total $P_2O_5$ content, 11.2% $P_2O_5$ soluble in 2% citric acid(1:100), 7.7% water-soluble $P_2O_5$(1:250), 2.9% moisture and 2.6% total nitrogen, was obtained.

EXAMPLE 5

A product prepared in the pilot plant, in dry condition, containing 19.2% total $P_2O_5$, 8% $P_2O_5$ soluble in 2% citric acid(1:100), 2.5% water-soluble $P_2O_5$(1:250) and 2.1% total nitrogen was agriculturally evaluated, in two successive crops. The first one was a rice crop and the second one, for the evaluation of a residual effect, was a corn crop, which has a high demand for phosphorus. Normal superphosphate was used as a basis for comparison, in the experiments. The samples studied for each crop were the following:

1. Cultivation without phosphorus application, with and without liming;
2. Cultivation with 150 ppm phosphorus, via pilot-plant produced fertilizer, with and without liming;
3. Cultivation with 300 ppm phosphorus via pilot-plant produced fertilizer, with and without liming.
4. Cultivation with 225 ppm phosphorus, via normal superphosphate, with and without liming.

In all of the samples, a balancing was made, of sulfur, potassium, nitrogen and micronutrients, in a "cerrado" soil.

Test results are to be found in Tables I and II.

TABLE I

Starting Crop - Rice

| Treatment | Dry Matter (g/pot)* |
|---|---|
| (1) N, K, Mg, S, MICRO | 1,762 c |
| (2) 1 + liming | 2,376 b |
| (3) 1 + 150 ppm P-fertilizer | 2,604 b |
| (4) 1 + 150 ppm P-fertilizer + liming | 3,345 a |
| (5) 1 + 300 ppm P-fertilizer | 3,032 ab |
| (6) 1 + 300 ppm P-fertilizer + liming | 3,025 ab |
| (7) 1 + 225 ppm P-simple superphosphate | 2,885 ab |
| (8) 1 + 225 ppm P-simple superphosphate + liming | 2,785 ab |

*Data followed by the same letters are not statistically different.

TABLE II second crop - corn (maize)

| Treatment | Dry matter (g/pot)* |
|---|---|
| (1) N, K, Mg, S, MICRO | 2.008 b |
| (2) 1 + liming | 2.203 b |
| (3) 1 + 150 ppm P-fertilizer | 1.822 b |
| (4) 1 + 150 ppm P-fertilizer + liming | 2.356 b |
| (5) 1 + 300 ppm P-fertilizer | 1.879 b |
| (6) 1 + 300 ppm P-fertilizer + liming | 3.323 a |
| (7) 1 + 225 ppm simple superphosphate | 2.059 b |
| (8) 1 + 225 ppm simple superphosphate + liming | 3.214 a |

*Data followed by the same letter are not statistically different.

We claim:

1. A process for the preparation of fertilizers comprising partially solubilizing phosphate rock by reacting said phosphate rock with a reactant selected from the group consisting of ammonium bisulfate, ammonium bisulfate plus sulfuric acid and ammonium sulfate plus sulfuric acid wherein:

a. The mole ratio of $H^+$ to $P_2O_5$ not soluble in 2% citric acid (1:100) is between 2 and 3,
    b. The mass ratio of water to the mass of dry phosphate rock concentrate is between 0.4 and 0.7,
    c. The reaction temperature is in the range of 55° to 95° C.,
    d. The reaction time is between 1 minute and 10 minutes, and
    e. The mole ratio of ammonium sulfate to sulfuric acid in the reaction system is between 0.5 and 1.0.

2. The process for the preparation of fertilizers according to claim 1, wherein said process is carried out in a reaction system comprising a mixing reactor, a belt conveyor or a granulator, and comprises the following steps:

A. Forming ammonium bisulfate by the reaction of ammonium sulfate and sulfuric acid or ammonia and sulfuric acid in an ammonium bisulfate forming reactor, followed by dilution of the product with water in an amount sufficient for the complete solubilization thereof,
    B. Feeding said ammonium bisulfate solution and powdered phosphate rock to said reaction system and carrying out the rock solubilizing reaction, and
    C. Recycling a part of the product obtained in step B, through said; granulator at a flow rate of between 0.5 and 3.0 of the recycled mass to the total mass of the other streams fed to said reaction system.

3. The process for the preparation of fertilizers, according to claim 2, wherein phosphate rock pulp at a solids weight concentration of between 45 and 85%, coming from a phosphate ore beneficiation system, is optionally fed to the reaction system, comprised of a mixing reactor, a belt conveyor or a granulator.

4. The process for the preparation of fertilizers according to claim 2, wherein a stream of sulfuric acid is fed to the reaction system, comprising a mixing reactor, a belt conveyor or a granulator.

5. The process for the preparation of fertilizers according to claim 2, wherein a stream of ammonium bisulfate dissolved in sulfuric acid is fed to the reaction system, comprising a mixing reactor, a belt conveyor or a granulator.

6. The process for the preparation of fertilizers, according to claim 2, wherein a stream of a solution of ammonium bisulfate in water is fed to the reaction system, comprising a mixing reactor, a belt conveyor or a granulator.

7. The process for the preparation of fertilizers according to claim 1, wherein said process is carried out in a reaction system comprising a mixing reactor, a belt conveyor or a granulator, and comprises the following steps:

A. Mixing phosphate rock pulp proceeding from a phosphate ore beneficiation system with all of the ammonium sulfate required by the formulation, which ammonium sulfate may or may not proceed from the reaction of ammonia and sulfuric acid, in a proper mixing vessel,
    B. Feeding said mixture to a reaction system comprising a mixing reactor, a belt conveyor or a granulator, where the mass is blended with sulfuric acid in order to form ammonium bisulfate "in situ", and carrying out the rock solubilizing reaction,
    C. Recycling a part of the product obtained in step B, through said granulator, at a flow rate of between 0.5 and 3.0 of the recycled mass per total mass of the other streams fed to said reaction system.

8. The process for the preparation of fertilizers, according to claim 7, wherein the phosphate rock pulp concentration is between 45 and 85%.

9. The process for the preparation of fertilizers, according to claim 7, wherein a part of the ammonium sulfate required is fed dissolved in sulfuric acid, thereby allowing reduction of the total amount of water fed to the reaction system.

10. The process for the preparation of fertilizers, according to claim 7, wherein powdered rock is fed together with the rock pulp to the reaction system.

* * * * *